US008612152B2

(12) United States Patent
Kim et al.

(10) Patent No.: US 8,612,152 B2
(45) Date of Patent: Dec. 17, 2013

(54) SYSTEM AND METHOD FOR PROVIDING DRIVING GUIDANCE SERVICE TO VEHICLES

(75) Inventors: Jungsook Kim, Daejeon (KR); Jeong Dan Choi, Daejeon (KR); Do Hyun Kim, Daejeon (KR); Kyoung Hwan An, Daejeon (KR); Kyung Bok Sung, Daejeon (KR); Seong Ik Cho, Daejeon (KR); Byung Tae Jang, Daejeon (KR); Sung Won Sohn, Daejeon (KR); Jong-Hyun Park, Daejeon (KR); Ju Wan Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 429 days.

(21) Appl. No.: 12/957,048

(22) Filed: Nov. 30, 2010

(65) Prior Publication Data

US 2011/0130894 A1    Jun. 2, 2011

(30) Foreign Application Priority Data

Nov. 30, 2009    (KR) ........................ 10-2009-0116867

(51) Int. Cl.
*G05D 1/00* (2006.01)
*G06F 7/00* (2006.01)
*G06G 7/76* (2006.01)
*G08G 1/00* (2006.01)

(52) U.S. Cl.
USPC ............................... 701/537; 701/2; 701/117

(58) Field of Classification Search
None
See application file for complete search history.

(56) References Cited

U.S. PATENT DOCUMENTS

| 4,986,384 | A  | * | 1/1991  | Okamoto et al. | ............. 180/167 |
| 5,420,883 | A  | * | 5/1995  | Swensen et al. | ............. 375/138 |
| 6,370,452 | B1 | * | 4/2002  | Pfister         | ............. 701/23 |
| 6,411,889 | B1 | * | 6/2002  | Mizunuma et al.| ............. 701/117 |
| 6,442,453 | B1 |   | 8/2002  | Fukuoka        |                      |
| 6,813,247 | B1 | * | 11/2004 | Hassan         | ............. 370/252 |
| 7,323,970 | B1 | * | 1/2008  | Murray et al.  | ......... 340/426.12 |
| 8,315,237 | B2 | * | 11/2012 | Berger et al.  | ............. 370/338 |

FOREIGN PATENT DOCUMENTS

| JP | 2001-109998   | 4/2001 |
| KR | 1020000046396 | 7/2000 |
| KR | 2002-0043264  | 6/2002 |
| KR | 1020040005057 | 1/2004 |
| KR | 1020040049765 | 6/2004 |
| KR | 10-0825761    | 4/2008 |
| KR | 1020090057766 | 6/2009 |

* cited by examiner

*Primary Examiner* — Khoi Tran
*Assistant Examiner* — Bao Long T Nguyen
(74) *Attorney, Agent, or Firm* — Nelson Mullins Riley & Scarborough LLP; Anthony A. Laurentano, Esq.; Chad L. Thorson, Esq.

(57) ABSTRACT

A system for remotely controlling a vehicle in a service area divided into plural service sectors includes: an infra sensor module installed in each service sector for periodically sensing obstacles and vehicles within the service sector; a vehicle controller mounted in each vehicle for requesting the driving guidance service and automatically controlling the vehicle in accordance with a vehicle control signal; and a local server installed in each service sector for communicating with the vehicle controllers through a driving guidance network based on information on the obstacles and vehicles sensed by the infra sensor module. The system further includes a global server for allocating network resources of the driving guidance network to allow the local server to communicate with the vehicle controllers using the allocated network resources.

17 Claims, 6 Drawing Sheets

SYSTEM AND METHOD FOR PROVIDING DRIVING GUIDANCE SERVICE TO VEHICLES

CROSS-REFERENCE(S) TO RELATED APPLICATION

The present invention claims priority of Korean Patent Application No. 10-2009-0116867, filed on Nov. 30, 2009, which is incorporated herein by reference.

FIELD OF THE INVENTION

The present invention relates to a technique for remotely guiding a vehicle, and more particularly, to a system and method for providing a driving guidance service a vehicle within a service area.

BACKGROUND OF THE INVENTION

Recently, an unmanned vehicle technique that enables a vehicle to automatically drive without a driver is being developed. In efforts to develop such a technique, some visible results are made in the road driving using such an unmanned vehicle. This unmanned vehicle technique has been developed to have various sensors mounted within a vehicle to collect all information associated with the road driving and then independently judge to take any actions based on the collected information.

In addition, some studies are ongoing to perform unmanned driving based on information required for vehicle driving, such as map information, road information, and the like, which are downloaded through wireless communications.

As described above, the existing techniques have been developed in such a way to install equipments in the unmanned vehicle itself, which collect information required for vehicle driving and determine the status thereof based on the collected information.

In the conventional unmanned vehicle techniques, however, various sensors and driving-related devices need to be installed in respective unmanned vehicles individually, thus making their manufacturing costs high and complicated manufacturing processes thereof.

SUMMARY OF THE INVENTION

Therefore, the present invention provides a system and method for providing a remote driving guidance service a vehicle within a service area, which remotely controls the vehicle without various sensing devices individually mounted on the vehicle.

In accordance with a first aspect of the present invention, there is provided a system for remotely controlling a vehicle in a service area divided into plural service sectors, including: an infra sensor module installed in each service sector for periodically sensing obstacles and vehicles within the service sector; a vehicle controller mounted in each vehicle for requesting the driving guidance service and automatically controlling the vehicle in accordance with a vehicle control signal; a local server installed in each service sector for communicating with the vehicle controllers through a driving guidance network based on information on the obstacles and vehicles sensed by the infra sensor module; and a global server for allocating network resources of the driving guidance network to allow the local server to communicate with the vehicle controllers using the allocated network resources.

In accordance with a second aspect of the present invention, there is provided a method for a driving guidance service periodically to remotely control vehicles in a service area divided into plural service sectors, each vehicle having a vehicle controllers mounted therein to request for the driving guidance service. The method includes: allocating, at a global server, the service area into service sectors within which each of the service sector a local server and an infra sensor module are installed;

detecting obstacles and vehicles periodically within the service sector; generating, at a local server, a remote control signal based on information about the obstacles and vehicles sensed by an infra sensor module within the service sector; and transmitting, at the local server, the remote control signal to the remote control signal to the vehicle controller which had requested the driving guidance service.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, an embodiment of the present invention will be described in detail with reference to the accompanying drawings which form a part hereof.

Figure 1:
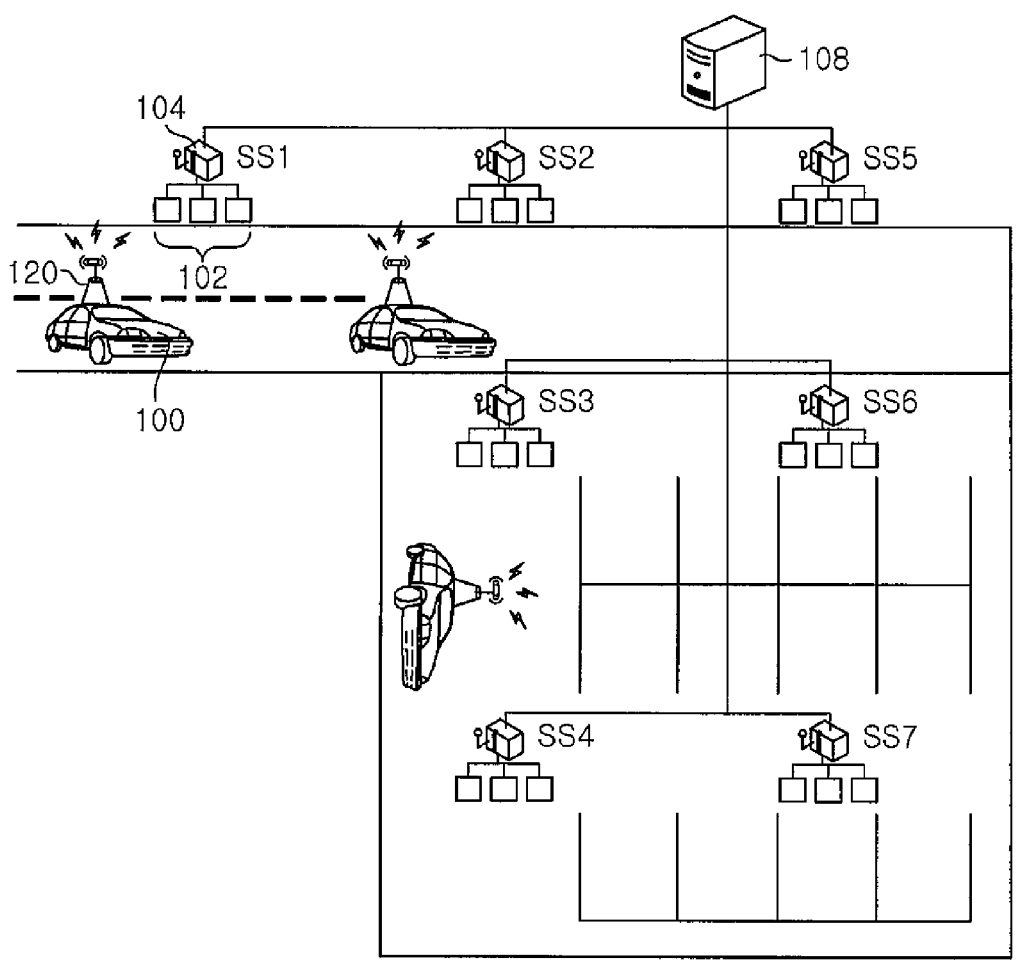
FIG. 1 is a schematic diagram of a system for remotely controlling a vehicle within a service area in accordance with an embodiment of the present invention.
Figure 2:
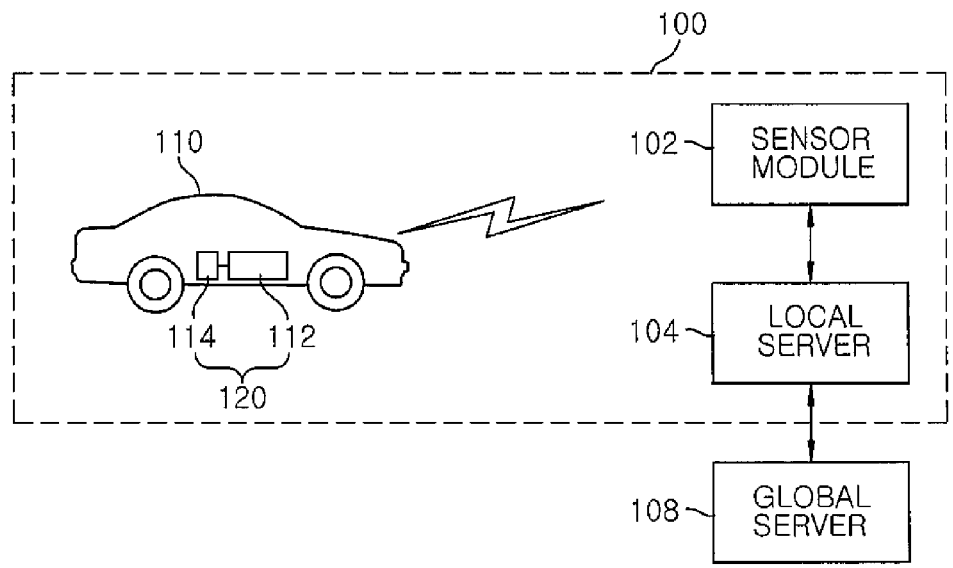
FIG. 2 is a simplified schematic block diagram of the system for controlling a vehicle shown in FIG. 1.

FIG. 1 is a schematic diagram of a system for remotely controlling a vehicle within a service area in accordance with an embodiment of the present invention, and FIG. 2 is a simplified block diagram of the system in FIG. 1 in which only one service sector is illustrated for simplicity and clarity of illustration.

The system provides a remote driving guidance service to a vehicle within a service area on a road so that the vehicle is remotely controlled. The service area is partitioned into a plurality of service sectors SS1 to SS7. For each service sector, an infra sensor module 102 and the local server 104 are installed.

The system includes a global server 108 for managing all the service sectors SS1 to SS7.

The infra sensor module 102 detects obstacles and vehicles 110 within a service sector, e.g., a service sector SS1, to provide the detected information to the global server 108. The vehicles 110 may be driven by a driver and/or automatically driven in remote manner and are equipped with vehicle controllers 120 which are vehicle-mounted devices, respectively. A vehicle controller 120 within the service sector SS1 requests a remote driving guidance service to the local server 104. Such a vehicle controller 120 may includes, but is not limited to, a navigation device, a mobile telephone, a smart phone, a personal digital assistant (PDA), a hand-held personal computer (PC), a notebook PC, and the like, which has a capability of communicating with the local servers 104 and automatically controlling the vehicle. The local server 104 generates a remote control signal for automatically controlling an accelerator, brake, gear, throttle and the like of the vehicle 110 and detailed navigation path for the vehicle 110 based on the sensed information from the infra sensor module 102. The remote control signal and guidance path are then provided to the vehicle controller 120 mounted in the vehicle 110 through a driving guidance network established between the local server 104 and the vehicle controller. The global server 108 performs a scheduling to allocate wireless resources of the driving guidance network to the respective local servers 104. To do it, the global server 108 divides a dedicated frequency band into several frequency bands of communication channels and divides a communication time into several time intervals, and then allocates the divided time intervals to the respective local servers 104 which communicate with the vehicle controllers 120.

Figure 3A:
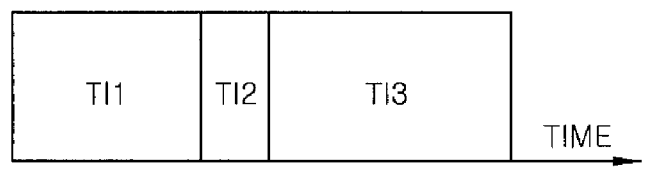
FIGS. 3A and 3B are views of superframes carrying scheduling information in accordance with the embodiment of the present invention.
Figure 3B:
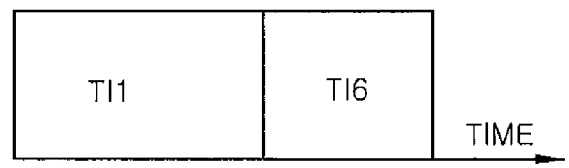

Schedule information about the time intervals and frequency bands are carried by a superframe to the local servers 104, as shown in FIGS. 3A and 3B. The schedule information enables the local server 104 and the vehicle controllers 120 to communicate one by one during one cycle. The superframe containing the schedule information is transmitted to all the local servers 104 from the global server 108 at the start time of the superframe.

For example, assuming that a service area is divided into seven service sectors SS1 to SS7, among the seven service sectors SS1 to SS7, only three sectors SS1 to SS3 involve vehicles and four service sectors SS4 to SS7 do not involve vehicles. Therefore, as shown in FIGS. 3A and 3B, the global server 108 allocates three time intervals TI1, TI2 and TI3 to the three local servers 104 within the service sectors SS1, SS2 and SS3 for communication with the vehicle controllers 120.

By allocating the resources in consideration of frequency, even any local server is installed within a close distance, e.g., two hops, can communicate with the vehicles 110 by using different bands during the same communication time interval.

In addition, the allocation of the time intervals may be performed based on the detected information, e.g., the number of vehicles within the service sector.

It can be seen from FIG. 3A that the time interval TI3 is longer than the time interval TI1, which, in turn, is longer than the time interval TI. It means that the service sector SS3 have more vehicles than the service sector SS1, which in turn is more vehicles than the service sector SS2.

On the other hand, there happens a handover in which a vehicle moves between service sectors. For example, it is assumed that a vehicle 110 within a service sector SS1 moves to another service sectors SS2 which is contiguous to the service sector SS1 on the movement path of the vehicle 110. Since the local server 104 within the service sector SS1 recognizes a position and a unique number of the vehicle 110 through the infra sensor module 102, the local server 104 can determine that the vehicle 110 will get out of the service sector SS1 at once.

If it is determined that the vehicle 110 will be out of the service sector SS1, the local server 104 notifies the global server 108 that the vehicle 110 will get out of the service sector SS1. Then, the global server 108 recognizes that the vehicle 110 will get out of the service sector SS1 and transmits a handover command to instruct the transfer of a control right of the vehicle 110 from the local server within the service sector SS1 to the local server within the service sector SS2.

The local server 104, in response to the handover command, notifies the vehicle controller 120 in the vehicle 110 that the local server 104 in charge of control within the service sector SS1 is changed to the local server within the service sector SS2 and relays the frequency band information to the local server within the service sector SS2 in advance, so that the vehicle 110 can be seamlessly communicated upon the handover between the service sectors SS1 and SS2. Thereafter, the control right of the vehicle 110 is transferred from the local server within the service sector SS1 to the local server within the service sector SS2. Hereinafter, a communication procedure between the local server 104 and the vehicle controller 120 mounted on the vehicle 110 through the driving guidance network within the service sector SS1 will be described with reference to FIG. 2.

The local server 104 can communicate with the vehicle controller 120 within the service sector during the allocated time interval at the allocated frequency band from the global server 108. The local server 104 transmits a packet of the remote control signal or a certain blank packet to the vehicle controller 120 within the service sector.

In response to the packet of the remote control signal, the vehicle controller 120 transmits a response packet to the local server 104. When there is a need to transmit data to the local server 104, the vehicle controller 120 attaches the data to the response packet and then transmits the response packet with the data to the local server 104.

The local server 104 may also transmit an inquiry packet, inquiring if communication is necessary, to the vehicle controller 120, in order to check whether there is any packet desiring to transmit to the local server 104, even if there is no packet to be transmitted to the vehicle controller 120 within the service sector. In response to the inquiry packet, the vehicle controller 120 transmits a response packet to the local server 104.

Upon the transmission of the response packet, if there is any data to be transmitted to the local server 104, the vehicle controller 120 attaches the data to the response packet prior to transmitting it.

In this way, the local server 104 can control all communications occurring within the service sector without collisions which may be occurred during the communications.

Once again, the local server 104 transmits the packet of the remote control signal, the inquiry packet, or the blank packet to the vehicle controller 120 within the service sector based on the detected information about the obstacles and the vehicles within the service sector, the remote control signal, a latest communication time with the vehicle controllers, priority of packets and the like.

As described above, in communications between the local server 104 and the vehicle controller 120, the local server 104 transmits the inquiry packet to the vehicle controller 120, whereby the vehicle controller 120 is allowed to transmit the response packet to the local server 104. Thus, it is impossible for the vehicle controller 120 to achieve an active communication by itself.

In case where a new vehicle controller intends to participate in the driving guidance network, there is a need a process for allowing the vehicle controller to participate in the driving guidance network.

To achieve the process, upon completion of communication with the respective vehicle controllers within the service sector, the local server 104 broadcasts a checking packet to examine whether there is any vehicle controller to require participating in the driving guidance network. Among the vehicle controllers receiving the check packet, if a vehicle controller has data to be transmitted once, the vehicle controller transmits a packet of the data to the local server 104. Thereafter, the vehicle controller receives a response packet from the local server 104 and then completes the communication.

If a vehicle controller continuously needs the communications with the local server 104, the vehicle controller transmits a request packet for a network connection to the local server 104. The local server 104, in response to the request packet for network connection, transmits an inquiry message inquiring to the global server 108 whether the vehicle controller transmitting the request packet is allowed to participate in the driving guidance network. When the local server 104 receives an allowance message for network connection from the global server 108, the local server 104 transmits the allowance message to the vehicle controller and then adds a vehicle having the vehicle data terminal to a list of the vehicles having the vehicle controllers which request the driving guidance service. Thereafter, the local server 104 can perform communication with the newly participated vehicle controller via the driving guidance network as set forth above as similar as other vehicles.

If there are several vehicle controllers receiving the broadcasted checking packet, these vehicle controllers can transmit their request packets in competition with one another, e.g., in a manner way to transmit the request packet for a maximum number of times, to transmit the request packet at a predetermined time interval. The vehicle controller that wins the competition can transmit its packet to the local server 104.

Meanwhile, in determining the priority of vehicle controllers, the local server 104 may determine the priority based on the type of the packets to be transmitted to the vehicle controllers, a latest communication time, the position of the vehicles and the like. Particularly, a highest priority is given to the packet of the remote control signal.

In addition, if there are several remote control signals, a priority is given to a most preceding vehicle because the preceding vehicle first moves and thus following vehicles can easily move during the remote driving guidance service within the service sector. Also, when the latest communication time with a vehicle is over a given time, the vehicle has the highest priority. Further, a priority is given to each of the vehicles 100 included in the vehicle list. For instance, if there are two vehicles within a service sector, a preceding vehicle in the traveling direction has a high priority. Also, the vehicle firstly requesting the driving guidance service may be given a high priority, and then the priority in the order of occurrence of such a request.

Figure 4:
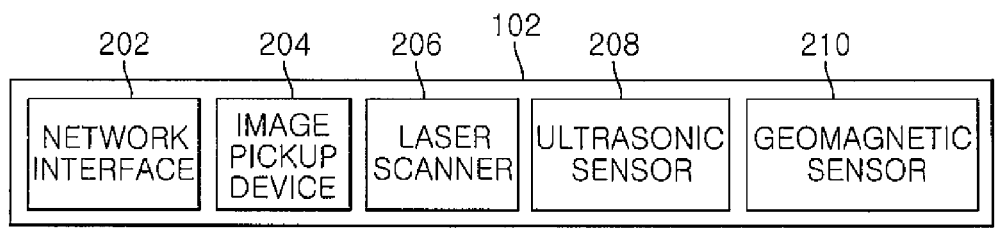
FIG. 4 is a detailed block diagram of the infra sensor shown in FIG. 1.

FIG. 4 is a detailed block diagram of the infra sensor 102 shown in FIG. 1. As shown in FIG. 4, the infra sensor module 102 includes a network interface 202, and a sensor group having an image pickup device 204, a laser scanner 206, an ultrasonic sensor 208, and a geomagnetic sensor 210.

The network interface 102 includes, for example, a LAN card, and serves to manage data communications between the infra sensor module 102 and the local server 104 through the driving guidance wireless network.

The image pickup unit 204 may include, for example, a traffic surveillance CCTV, a traffic information collection camera and the like to obtain an image of vehicles and obstacles in the service sector. The sensed information is then transmitted to the local server 104 via the network interface 202.

The laser scanner 206 may include, e.g., a 2D (a two-dimensional) or 3D (three-dimensional) scanner and the like to scan vehicles and obstacles in the service sector. The acquired information is then transmitted to the local server 104 via the network interface 202.

The ultrasonic sensor 208 and the geomagnetic sensor 210 also sense vehicles and obstacles and transmit the sensed information to the local server 104 via the network interface 202.

Figure 5:
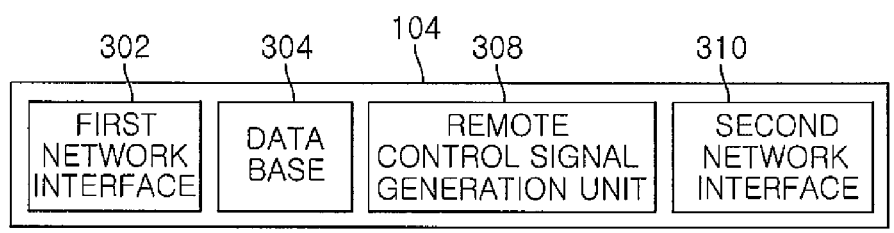
FIG. 5 is a detailed block diagram of the local server shown in FIG. 1.

FIG. 5 is a detailed block diagram of the local server 104 shown in FIG. 1.

As shown in FIG. 5, the local server 104 includes a first network interface 302, a database (DB) 304, a remote control signal generation unit 308, and a second network interface 310.

The first network interface 302 includes, for example, a LAN card, to communicate with the global server 108. The second network interface 310 also includes, for example, a LAN card, to communicate with the vehicle controller 120.

The DB 304 stores the detected information about vehicles and obstacles provided from the infra sensor module 102 and a list having IDs of the vehicle controllers or vehicles 110 within the service area.

The remote control signal generation unit 308 extracts information about the obstacles and vehicles within the service sector, e.g., the position and size of the obstacles, the time when a obstacle is detected, an obstacle tracking path, the position and size of the vehicles, a vehicle registration number, the time when a vehicle is detected and the like, based on the detected information which are stored in the DB 304. In addition, the remote control information generation unit 308 can check the number of the obstacles and vehicles for the service sector based on the detected information. The remote control signal generation unit 308 generates a remote control signal for controlling accelerator, brake, handle, gear and the like needed to remotely operate the vehicles 110 and navigation path containing road and route information based on the extracted information. The remote control signal and the navigation path are then transmitted to the vehicle controller 120 through the second network interface 310.

Though the first and the second network interfaces are employed in the local server 104 in this embodiment, it will be appreciated to those skilled in the art that only one of the first and the second network interfaces is used to communicate with both the global server 108 and the vehicle controller 120.

Figure 6:
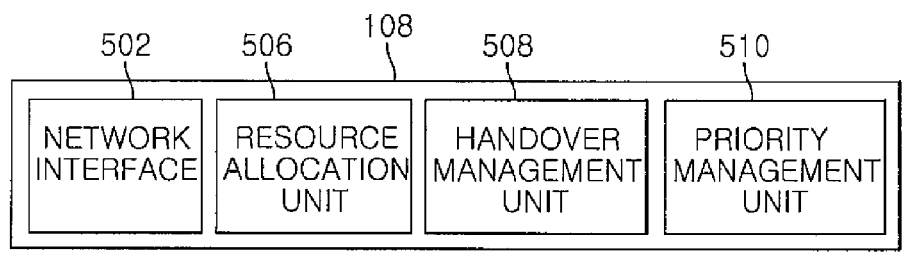
FIG. 6 is a detailed block diagram of the global server shown in FIG. 1.

FIG. 6 is a detailed block diagram of the global server 108 shown in FIG. 1.

As shown in FIG. 6, the global server 108 includes a network interface 502, a resource allocation unit 506, a handover management unit 508, and a priority management unit 510.

Specifically, the network interface 502 communicates with the local servers 104. That is, the network interface receives sensed information and a request for a driving guidance service and transmits the schedule information to the respective local server 104.

The resource allocation unit 506 allocates resources of the driving guidance network to respective local servers 104. That is, the resource allocation unit 406 divides a communication time into several time intervals, and then allocates the time intervals to the respective local servers 104.

The handover management unit 508 manages the handover of the vehicle controller 120 to move between the service sectors which are adjacent with each other. The handover management unit 508 detects a vehicle moves from a service sector where the vehicle has been served the vehicle guidance service to another service sector and transmits a handover command to a local server in the another service sector.

The priority management unit 510 gives a priority to the vehicles for the driving guidance service. As described above, the priority is given to the vehicles based on a preceding vehicle in the traveling direction thereof. In addition, the priority is given to the vehicles based on the order of the request for driving guidance service.

Figure 7:
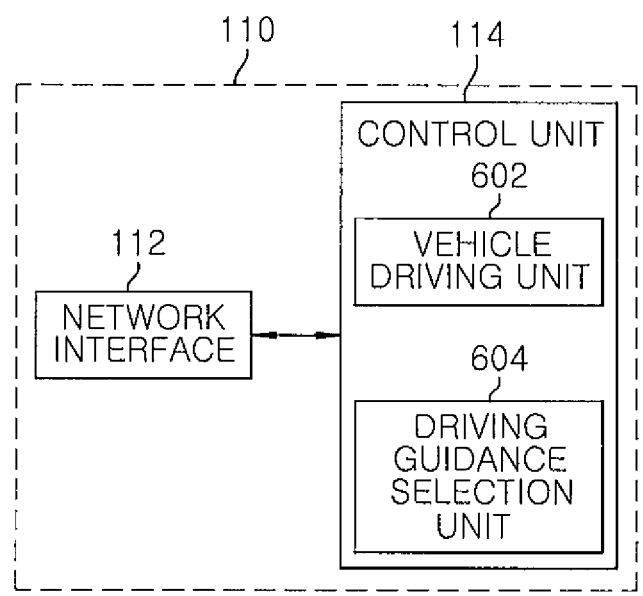
FIG. 7 is a detailed block diagram of the vehicle controller shown in FIG. 1.

FIG. 7 is a block diagram of the mobile data terminal 12 shown in FIG. 1.

As shown in FIG. 7, the vehicle controller 120 includes a network interface 112 and a control unit 114 which includes a vehicle driving unit 602 and a driving guidance selection unit 604.

The network interface 112 includes, e.g., a LAN card, and periodically communicates with the local server 104. For example, the network interface 112 transmits a request for a driving guidance service of the vehicle 110 to the local server 104 and receives the vehicle control signal from the local server 104.

The vehicle driving unit 602 in the control unit 114 controls, for example, an accelerator and a brake of the vehicle 110 based on the vehicle control signal to perform acceleration and deceleration, as well as vehicle driving such as straight line driving and curved line driving, left rotation, right rotation, U-turn, avoidance of obstacle or other vehicles and the like.

Figure 8:
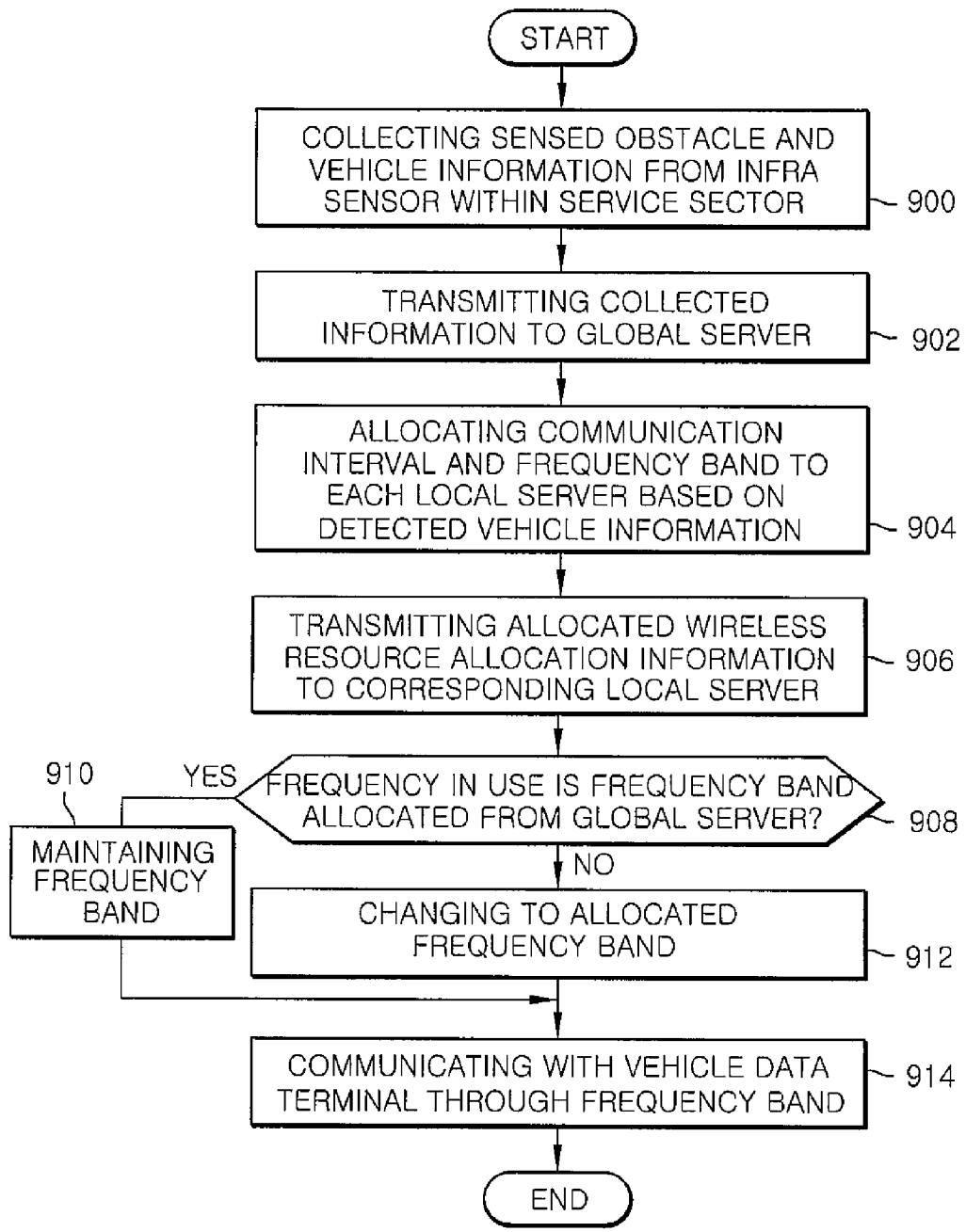
FIG. 8 is a flowchart illustrating a procedure of allocating communication resources of driving guidance network in accordance with the embodiment of the present invention.

FIG. 8 is a flowchart illustrating a procedure of allocating wireless communication resources from the global server 108 to each local server 104 in accordance with the embodiment of the present invention.

First, the local server 104 collects sensed obstacle and vehicle information from the infra sensor 102 within a service sector served by the local server 104 in block 900 and then transmits the collected information to the global server 108 in block 902.

Next, the global server 108 receives and stores sensed information from each local server 104, allocates a communication interval and frequency band to each local server based on the detected vehicle information in block 904, and then transmits the allocated wireless resource allocation information to the corresponding local server in block 906.

In block 908, the local server, in response to the wireless resource allocation information, determines whether or not a frequency in use is a frequency band allocated from the global server 108. If the frequency in use is the allocated frequency band, the local server 104 maintains the frequency in use in block 910, and then proceeds to block 914. But, if the frequency in use is out of the allocated frequency band, the local server 104 goes to block 912 to change to the allocated frequency band.

Thereafter, in block 914, the local server 104 communicates with the vehicle controller through the frequency band during the allocated time interval.

Figure 9:
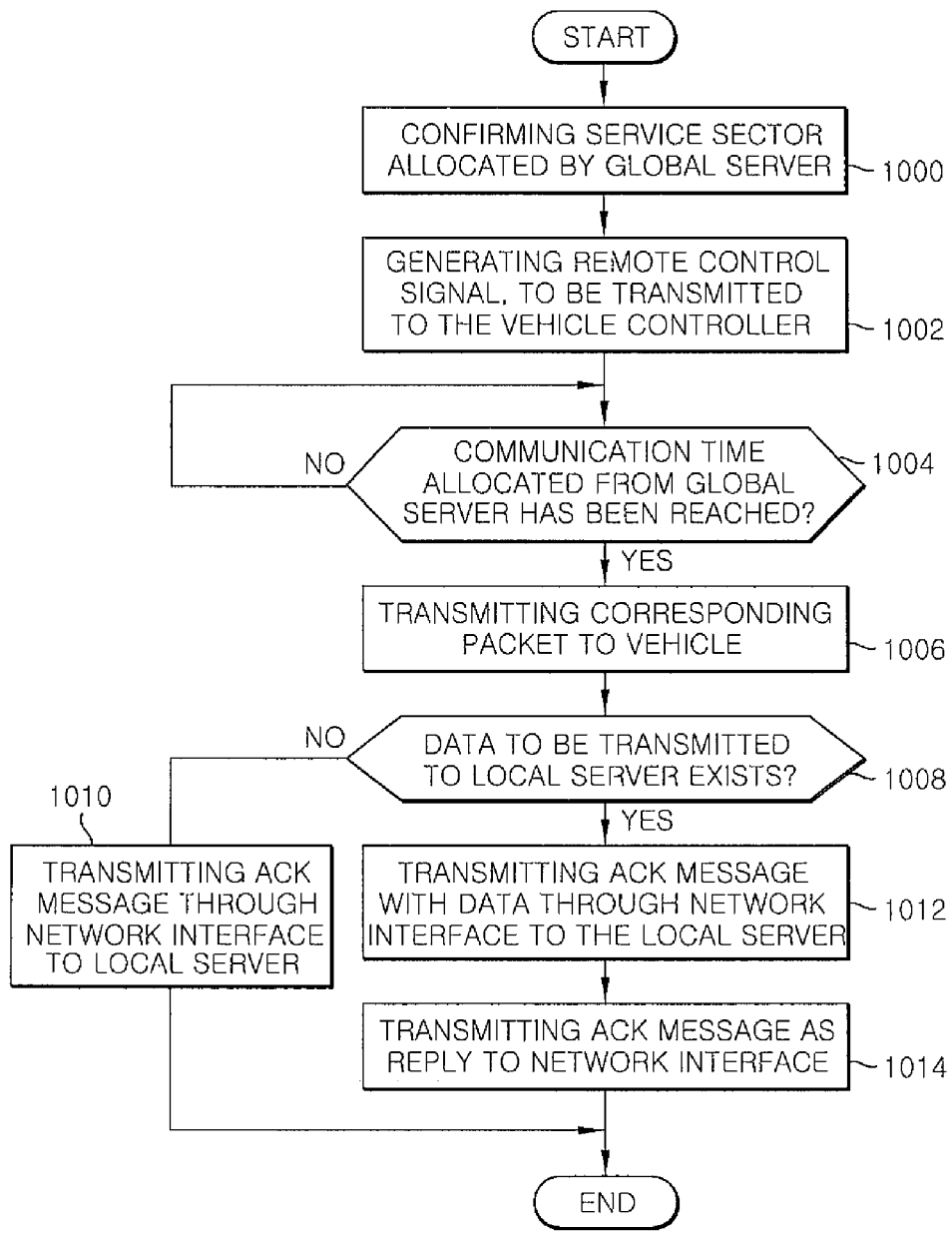
FIG. 9 is a flowchart illustrating a procedure of performing data transmission/reception between the local server and the vehicle controller in accordance with the embodiment of the present invention.

FIG. 9 is a flowchart illustrating a procedure of performing data transmission/reception between the local server and the vehicle controller in accordance with the embodiment of the present invention.

First, in block 1000, the local server 104 confirms a service sector allocated by the global server 108, and detects obstacles and vehicles within its service sector through the use of the sensors. Thereafter, the local server 104 generates remote control signal, to be transmitted to the vehicle controller 120 in block 1002.

Subsequently, the local server 104 determines whether the communication time allocated from the global server 108 has been reached in block 1004.

If it is determined that the communication time allocated from the global server 108 has been reached, the process proceeds to block 1006 to transmit the corresponding packet to the vehicle 110.

After that, the vehicle controller determines whether there is any data to be transmitted to the local server 104 in block 1008. If there is no data to be transmitted, in block 1010, the vehicle controller transmits an ACK message through the network interface 112 to the local server 104. If, however, there is any data to be transmitted, the vehicle controller transmits an ACK message with the data, e.g., an inquiry about a request for vehicle guidance control information, a request for driving guidance service through the network interface 112 to the local server 104.

In subsequence, upon receipt of the ACK message and data, the local server 104 transmits an ACK message as a reply to the network interface 112 in block 1014.

As described above, the embodiment of the present invention effectively controls communications between the local server and the vehicle based on sensed information acquired by the infra sensor, thus enabling communications without disconnection although the vehicle moves between the divided service areas. In addition, by a control of the vehicle control system based on the sensing information from the infra sensor, the vehicle network interface and the local server can stably perform communications without conflict.

As a result, the system and method for controlling a vehicle based on the infra sensor in accordance with the embodiment of the present invention can detect obstacles and vehicles using the infra sensor, without having sensors installed in the vehicle, and then can wirelessly control the vehicle by a local server installed at a road side. That is, the system and method in accordance with the embodiment of the present invention install only the vehicle control unit for vehicle control, excluding various sensors for external sensing, within the vehicle, and then performs environmental sensing and determination required for vehicle driving guidance by various sensors and servers installed in the infrastructure, followed by providing information for vehicle driving guidance to the vehicle network interface within the vehicle through the local servers.

While the invention has been shown and described with respect to the particular embodiments, it will be understood by those skilled in the art that various changes and modifications may be made without departing from the scope of the present invention as defined in the following claims.

What is claimed is:

1. A system for remotely controlling a vehicle in a service area divided into plural service sectors, comprising:
    an infra sensor module installed in each service sector for periodically sensing obstacles and vehicles within the service sector;

a vehicle controller mounted in each vehicle for requesting a driving guidance service and automatically controlling the vehicle in accordance with a vehicle control signal;
a local server installed in each service sector for communicating with the vehicle controllers through a driving guidance network based on information on the obstacles and vehicles sensed by the infra sensor module; and
a global server for allocating network resources of the driving guidance network to allow the local server to communicate with the vehicle controllers using the allocated network resources,
wherein the global server includes:
a network interface for communicating with the local servers;
a wireless resource allocation unit for allocating a communication time interval and a dedicated frequency band of the network resources of the driving guidance network to a vehicle requesting the driving guidance service to each local server; and
a handover management unit for detecting movement of the vehicle from a service sector where the vehicle has been served the driving guidance service to another service sector and transmitting a handover command to a local server in the another service sector.

2. The system of claim 1, wherein the local server includes:
a network interface for communicating with the global server;
a database for storing therein the sensed information on the obstacles and the vehicles, and a list of the vehicles having vehicle controllers which request the driving guidance service;
a vehicle control signal generation unit for generating a vehicle control signal of the vehicles based on the sensed information on the obstacles and vehicles to provide the vehicle control signal to the vehicle controllers requesting the driving guidance service; and
a second network interface for communicating with the vehicle controllers within the service sector.

3. The system of claim 2, wherein the allocated network resources includes a frequency band through which the local server communicates with the vehicle controllers within the service sector and a communication time interval during which the local server communicates with each of the vehicle controllers requesting the driving guidance service.

4. The system of claim 2, wherein the second network interface receives a request for the driving guidance service from the vehicle controllers and transmits the vehicle control signal to the vehicle controllers.

5. The system of claim 4, wherein the local server broadcasts a checking packet to examine whether there is any vehicle controller to require participating in the driving guidance network to the vehicle controllers within the service sector, and upon receipt of a request packet for a network connection from a vehicle controller, transmitting an inquiry message, inquiring to the global server whether the vehicle controller transmitting the request packet is allowed to participate in the driving guidance network.

6. The system of claim 1, wherein the global server further includes a priority management unit for giving a priority to vehicles for the driving guidance service.

7. The system of claim 6, wherein the priority is given to the vehicles based on a preceding vehicle in the traveling direction thereof.

8. The system of claim 6, wherein the priority is given to the vehicles based on the order of the request for driving guidance service.

9. The system of claim 1, wherein the infra sensor module includes at least one of an image pickup device, a laser scanner and an ultrasonic sensor and geomagnetic sensor.

10. The system of claim 1, wherein the vehicle controller includes:
a network interface for communicating with the local server; and
a vehicle control unit for making the request for the driving guidance service and controlling the vehicle based on the vehicle control signal.

11. A method for a driving guidance service periodically to remotely control vehicles in a service area divided into plural service sectors, each vehicle having a vehicle controller mounted therein to request for the driving guidance service, comprising:
detecting obstacles and vehicles periodically within each service sector;
generating, at a local server, a remote control signal based on information about the obstacles and vehicles sensed by an infra sensor module within each service sector; and
transmitting, at the local server, the remote control signal to the vehicle controller which had requested the driving guidance service,
wherein said allocating a local server further includes:
detecting movement of the vehicle from a service sector where the vehicle has been served the driving guidance service to another service sector; and
transmitting a handover command to a local server in the another service sector.

12. The method of claim 11, wherein said generating a remote control signal includes:
receiving, at the local server, information of divided service sector allocated from the global server;
collecting the information on the obstacles and the vehicles from the infra sensor module to store the information in a database;
upon the receipt of the request for the driving guidance service from the vehicle controller within the service sector, transmitting an inquiry message inquiring to the global server whether the vehicle controller requested for the driving guidance service is allowed to get the driving guidance service;
generating the remote control signal based on the collected information on the obstacles and the vehicles; and
transmitting vehicle control information to the vehicle controller requesting the driving guidance service.

13. The method of claim 12, wherein the allocated network resources includes a frequency band through which the local server communicates with vehicle controllers within the service sector and a communication time interval during which the local server communicates with each of the vehicle controllers requesting the driving guidance service.

14. The method of claim 12, wherein said generating a remote control signal further includes logging information in a list of vehicles having the vehicle controllers which request the driving guidance service.

15. The method of claim 12, wherein said generating vehicle control information further includes:
broadcasting a checking packet to examine whether there is any vehicle controller to require participating in the driving guidance network to vehicle controllers within the service sector.

16. The method of claim 11, further comprising giving a priority to vehicles for the driving guidance service based on a preceding vehicle in the traveling direction thereof or the order of the request for driving guidance service.

17. The method of claim 15, further comprising:
upon receipt of the checking packet from the local server, determining whether or not there is a request for the driving guidance service to transmit a request message for the driving guidance service to the local server; and
upon receipt of the remote control signal from the local server, driving the vehicle based on the remote control signal.

* * * * *